United States Patent [19]

Ivo

[11] Patent Number: 5,439,345

[45] Date of Patent: Aug. 8, 1995

[54] AUTOMATIC DISTRIBUTOR OF STACKED PACKAGES

[75] Inventor: Argazzi Ivo, Pianoro, Italy

[73] Assignee: Progetto Automazione S.R.L., Parma, Italy

[21] Appl. No.: 191,612

[22] Filed: Feb. 4, 1994

[30] Foreign Application Priority Data

Feb. 8, 1993 [IT] Italy .................. BO93A0039 U

[51] Int. Cl.⁶ .............................................. B65G 59/06
[52] U.S. Cl. ................................. 414/797.9; 221/133; 221/241; 221/273; 221/274
[58] Field of Search ........................... 414/797.9, 797.6; 221/131, 133, 241, 242, 273, 274

[56] References Cited

U.S. PATENT DOCUMENTS

| 3,313,449 | 4/1967 | Parks | 221/242 |
| 3,631,992 | 1/1972 | Dickinson | |
| 3,913,750 | 10/1975 | Sarring | 414/797.9 |
| 4,077,188 | 3/1978 | Strombeck et al. | 221/273 |
| 4,244,671 | 1/1981 | Sera et al. | 414/797.9 |
| 4,557,472 | 12/1985 | Hannon | 221/241 |
| 4,921,128 | 5/1990 | Guigan et al. | 414/797.9 |
| 5,064,341 | 11/1991 | Pipin | 221/131 |
| 5,271,703 | 12/1993 | Lindquist | 414/797.9 |

FOREIGN PATENT DOCUMENTS

| 0192206 | 8/1986 | European Pat. Off. |
| 0383000 | 8/1990 | European Pat. Off. |
| 2248217 | 5/1975 | France |
| 0037989 | 10/1981 | France |
| 1001813 | 10/1954 | Germany |
| 2220649 | 1/1990 | United Kingdom | 414/797.9 |

Primary Examiner—Michael S. Huppert
Assistant Examiner—Thomas J. Brahan
Attorney, Agent, or Firm—McAulay Fisher Nissen Goldberg & Kiel

[57] ABSTRACT

An automatic distributor of stacked packages includes two lines of stacking means counterfaced and spaced apart from each other, having their respective outlets counterfaced and leading to the inside of the distributor, and two lines of delivery means operating respectively in each row of stacking means, with each delivery means normally sliding in respect to the longitudinal axis of the distributor. Operating means are designed to engage and operate the delivering means in accordance with commands received, while conveying means are situated between the two rows of stacking means.

8 Claims, 5 Drawing Sheets

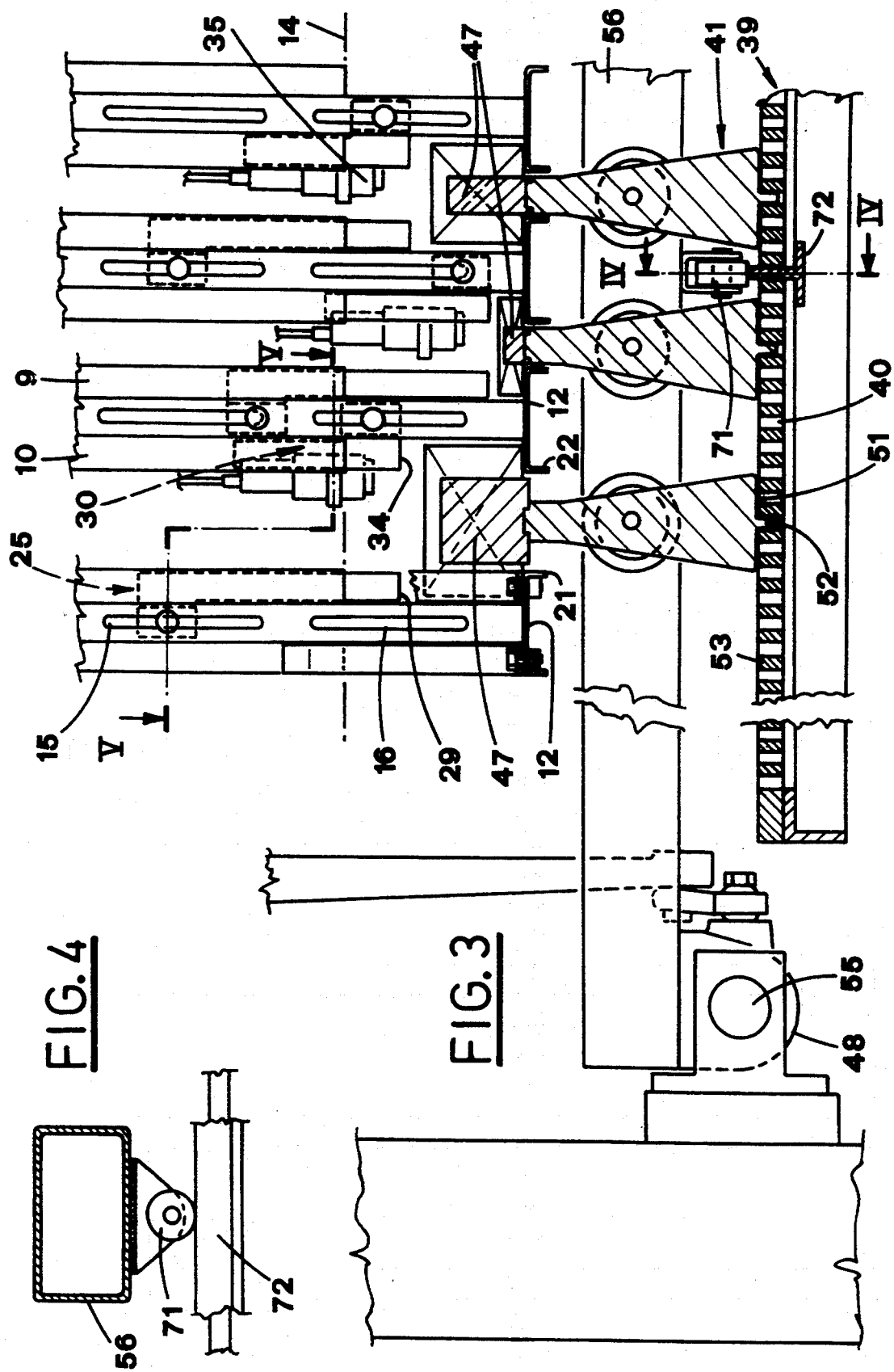

AUTOMATIC DISTRIBUTOR OF STACKED PACKAGES

BACKGROUND OF THE INVENTION

The present invention concerns an automatic distributor of stacked packages.

DESCRIPTION OF THE PRIOR ART

At present, there are known distributors for the automatic delivery of various packages which are previously been stored in stacks after having been selected, set in order and controlled.

The European Patent Application published under the number EP-A-0 383 000 describes such a distributor comprising a modular store with increased density of vertical stacking constituted by a longitudinal crosspiece provided with equidistant joints designed to hold vertical walls that define the packages width.

The vertical walls are provided with equidistant grooves in which other vertical walls, transverse to the precedent ones, are inserted for defining the package depth.

In this way a vertical channel is formed in which the in-box goods are stacked. Moreover, the above mentioned distributor provides a plurality of expellers inserted in modular channels, made in a bottom plane of the distributor, to expel the product situated at the bottom of the vertical stacking channel, said expellers being operated by electronic control.

Other distributors proposed for the automatic distribution of packages and/or constructive details related to them are described in the patents: EP-A-0 037 989, DE-C-1.001.813, EP-A-0 192 206, FR-A-2.248.217 and U.S. Pat. No. 3,631,992.

Generally, the above mentioned distributors present various disadvantages in construction, operation, changing of the package size, maintainance and have enormous size, as well.

Such disadvantages result mainly from the fact that the driving means are situated in places not easily accessible, therefore the operations of assembly, adjustment, size change and maintainance are complicated and expensive.

Furthermore, for each longitudinal line of stacked packages a conveyor is required and the adjustment of the transversal section of the vertical channel used for stacking requires various operations, that is removal and fixing of the walls that form the channel.

SUMMARY OF THE INVENTION

The object of the present invention is therefore, to overcome the above reported disadvantages.

The invention, overcomes the above reported disadvantages and is an automatic distributor of packages comprising stacking means with vertical channels for stacking the packages, delivering means for the delivery of at least one single package from the respective stack of packages, operating means for operation of the delivering means in accordance with commands received, and conveying means for transporting the delivered packages to a collecting zone, and characterized in that the distributor includes:

two rows of counterfacing stacking means spaced apart from each other, having their respective outlet facing each other and leading towards the inside of the distributor;

two rows of delivering means operating respectively in each row of stacking means, with each delivery element normally sliding in respect to the longitudinal axis of the distributor and operating in at least one package stacking channel;

conveying means situated between said two rows of stacking means.

The advantages of the present invention result essentially from the fact the driving means are situated in places easily accessible, therefore in the phase of assembly, adjustment, size change and maintainance the operations are easier.

Furthermore, a single conveyor is required to carry the articles delivered from the two lines of stacking means.

The walls defining the stacking channels are shaped in such a way that they allow for an easy adjustment of the same when a package size change is required.

BRIEF DESCRIPTION OF THE DRAWINGS

Further characteristics and advantages of the present invention will be more evident from the following detailed description of a preferred form of embodiment, given as a mere example not limitative, with reference to the attached drawing figures, in which:

FIG. 1a is an enlarged view of detail A of FIG. 1;

FIG. 3 is a schematic side view of the distributor;

FIG. 4 is a sectional view along the line IV—IV of FIG. 3;

DESCRIPTION OF THE PREFERRED EMBODIMENT

Figure 1:
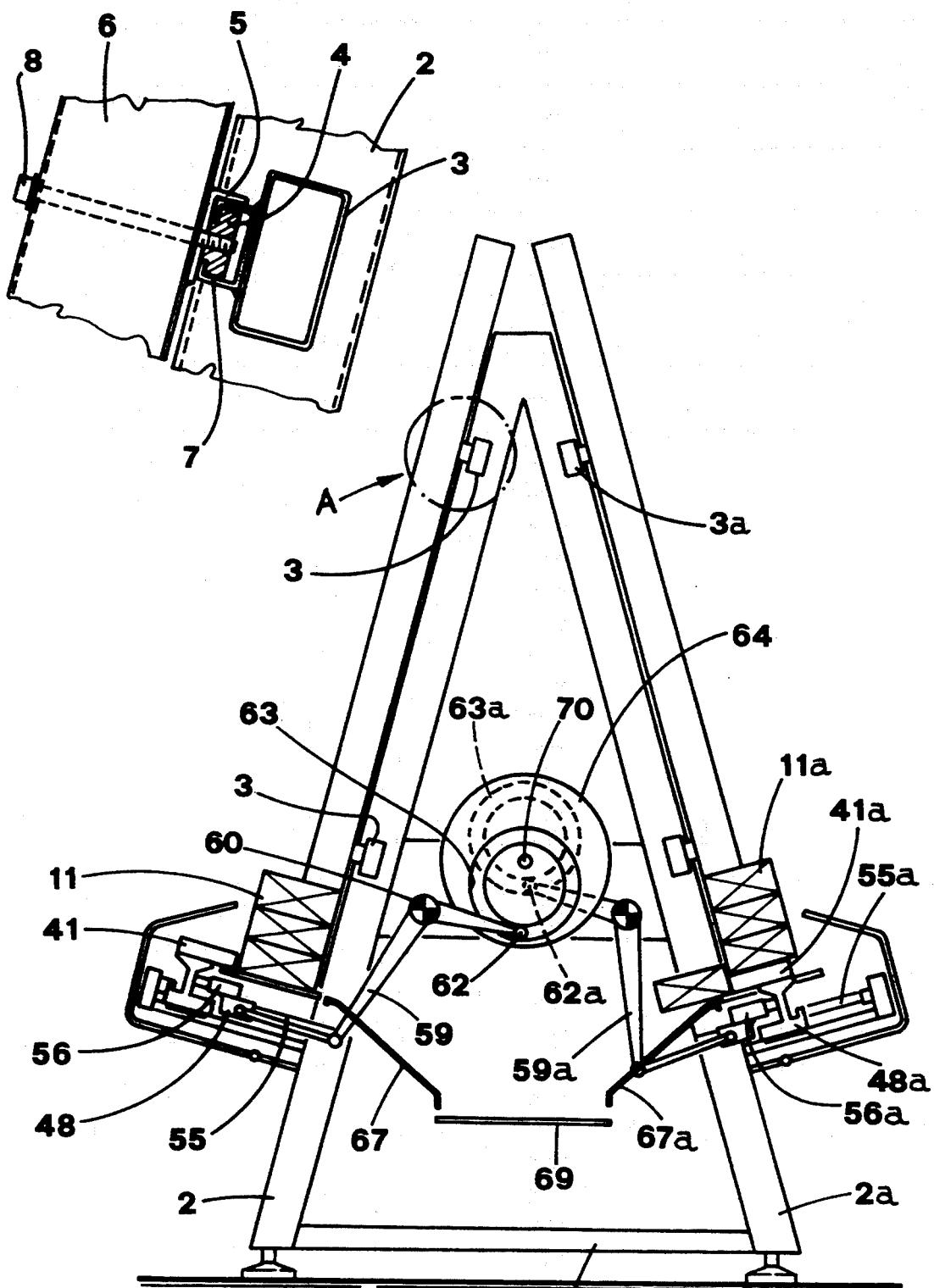
FIG. 1 is a schematic frontal view of the distributor.

With reference to FIG. 1, the distributor consists of a pyramidal structure, substantially symmetrical to a vertical plane. The elements situated on the left of said symmetry plane are indicated with an Arabic numeral, while corresponding elements situated on the right of the symmetry plane are indicated with the same reference numeral followed by the letter "a".

The above mentioned pyramidal structure includes a bottom 1 and at least two pairs of columns 2,2a located at the longitudinal distributor ends and extending upwardly an, convergently.

The columns 2, 2a, seen in particular in FIGS. 1 and 1a, support cross bars 3, 3a disposed transversally on each side of the distributor and, in the specific case, these consist of rectangular section tubes, placed longitudinally along the sides of the distributor.

A profiled section bar 7 is bound to each cross bar 3, 3a, seen in particular in FIG. 1a, and the bar 7 extends longitudinally and parallely to the cross bar 3.

Each profiled section bar 7 has a "C" shaped form and defines a sliding guide longitudinal to the distributor and designed to cooperate with a first internal slider 4 and a second outer slider 5.

The outer slider 5 is bound to a second profiled section bar element 6, described below the slider, extending parallely to the columns 2.

The bar element 6 is joined to the slider 4 by means of a bolt 8 (FIG. 1a) in such a way that, by releasing the bolt 8, it is possible to position, slidingly, the bar element 6 longitudinally in respect to the the cross bars 3 and 7, while by screwing the same bolt 8, the bar element 6 is constrained to the "C" shaped profiled section bar 7, thus fixing the position of said bar element 6 in respect to said cross bars 3 and 7.

Figure 5:
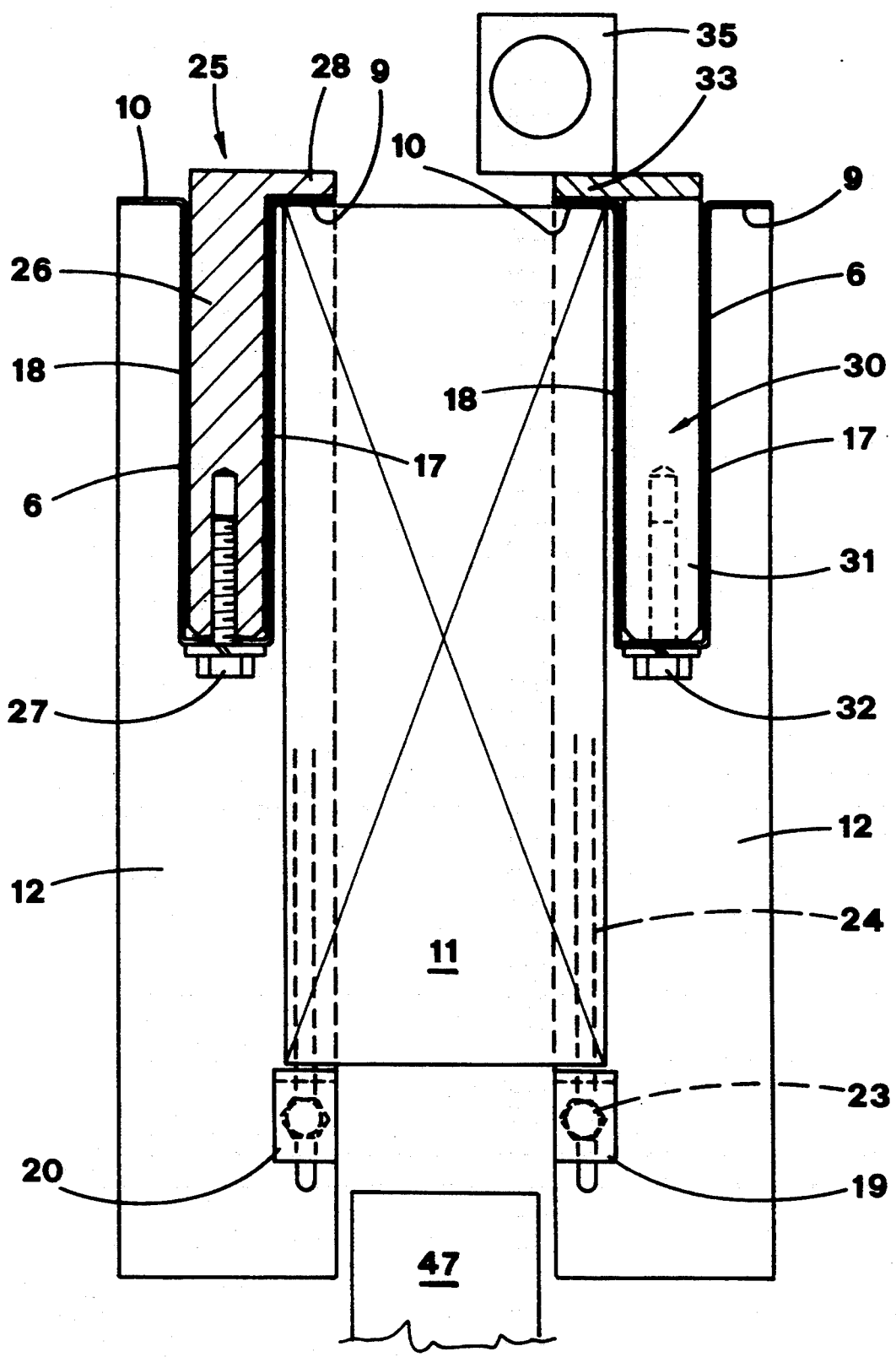
FIG. 5 is a sectional view along the line V—V of FIG. 3.

Each bar element 6, seen in particular in FIGS. 1a and 5, has an "omega" or "hat" form with coplanar wings 9 and 10 directed toward the inside of the distributor.

Between two adjacent bars 6, a vertical channel is formed, slightly inclined toward the inside of the distributor, for stacking the packages 11.

The channel wall, turned toward the inside, or unloading wall, is defined by two wings 9, 10 of two adjacent bars 6, 6, while the side walls of the same channel are defined by vertical planes 17 and 18 of the same two adjacent bars 6, 6.

With such a structure, by moving away or closer the bars 6, the stacking channel can be adapted to packages of different widths.

Each vertical element 6, as seen in FIG. 3, is at a determined distance from the bottom, in the specific case, below the line 14, element 6 is devoid of the "wings" 9 and 10, due to the reasons given in the following.

An upturned U-shaped profiled section bar 12 is bound to the foot of each bar 6, said element 12 normally extending with respect to the longitudinal axis of the distributor in such a way that the stacked packages 11 remain resting between two transversal counterfacing ends 21,22 of two adjacent bars 12, 12.

Figure 2:
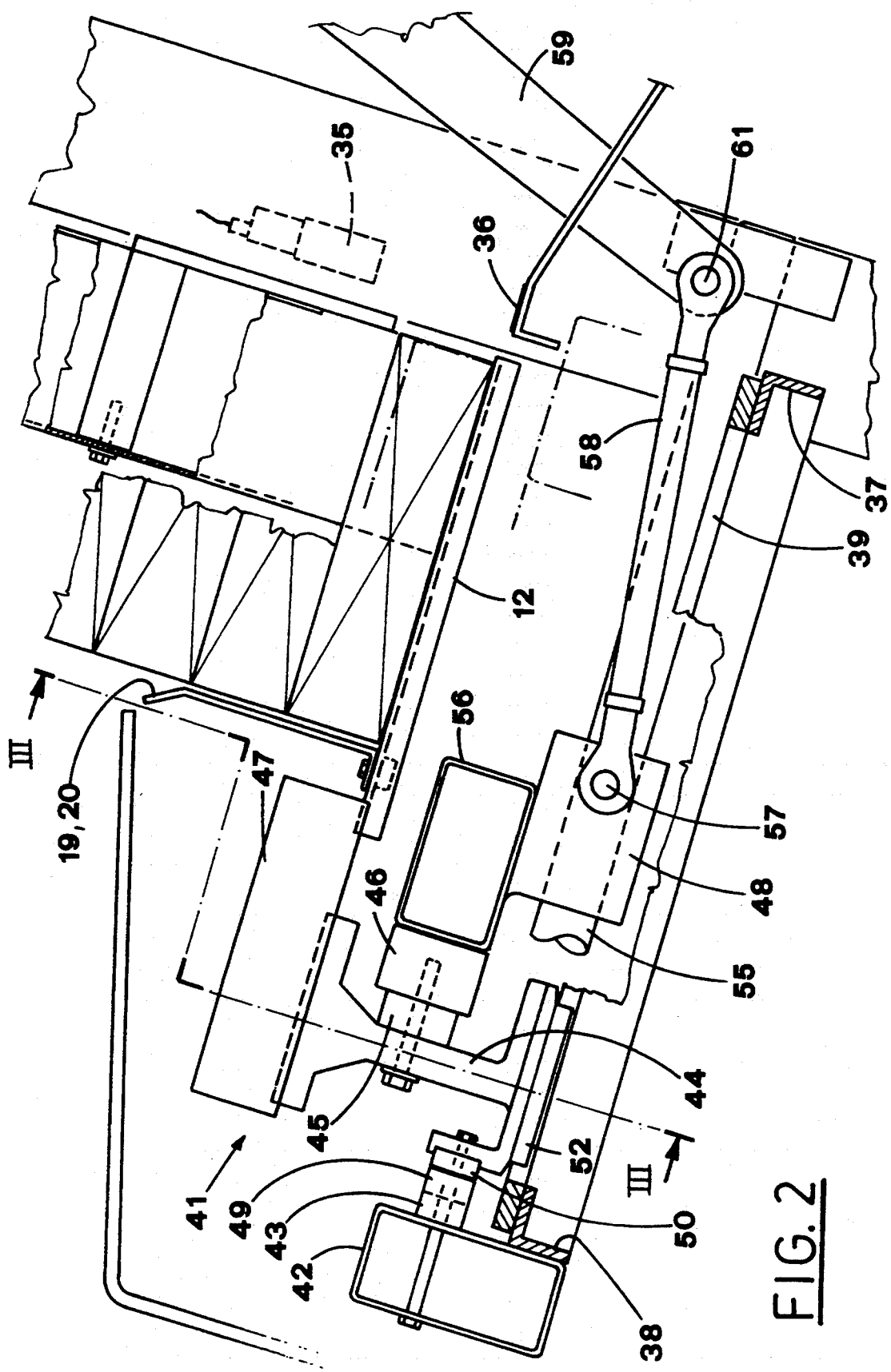
FIG. 2 is a front view of the delivery area.

Each profiled section bar 12, seen in FIGS. 2 and 5, has a pair of vertical elements 19, 20 which are situated near the end of each bar opposite to the outlet for the packages 11, so that two vertical elements 20-19 of two adjacent bars 12, 12 form the rear wall of a stacking channel for the packages 11. The vertical elements 19, 20 are bent at the top outwardly with respect to the channel EP.

Each vertical element 19 or 20 is fastened to the related bar 12 by means of a screw 23 that passes through an axial slot 24 made in the same bar 12, so that each package stacking channel has the rear wall 20-19 adjustable in accordance with the length of the package to be stacked. This adjustment can be carried out by shifting the vertical elements 19-20.

Referring to FIG. 3, it will be seen that two slots 15 and 16 are made in each bar 6, that is an upper slot and a lower slot respectively.

The upper slot 15 is allows vertical movement to a first "L"- shaped bracket 25 constrained to the bar 6, as seen in FIG. 5.

The bracket 25 has a long portion 26 inserted into said bar element 6, sliding therein, and can be constrained thereto by tightening a screw 27 that passes through the slot 15.

A short portion 28 of the bracket 25 extends vertically along the wing 9 of the bar element 6, so that the bracket lower end 29 can be located in any position along a vertical path delimited by the line 14 and the bottom 12.

In this way a part of a frontal wall of the stacking channel is formed, in this specific case for the left corner of the frontal end of the package 11.

This part of the frontal wall of the stacking channel is formed, above the line 14, by the wing 9 of the bar element 6, as already mentioned.

The lower slot 16 is aimed at allowing vertical movement to a second "L"-shaped bracket 30 constrained to the bar element 6, as seen in FIG. 5.

The second "L"-shaped bracket 30 has a long portion 31 inserted into said bar element 6, sliding therein, and can be locked to the bar element by tightening a screw 32 that passes through the slot 16.

A short portion 33 of the second bracket 30 extends vertically along the wing 10 of the bar element 6 so that the bracket lower end 34 can be located in any position along a vertical path delimited by the line 14 and the bottom 12.

In this way, another part of the frontal wall is formed for the stacking channel, in this specific case for the right corner of the frontal end of the package 11, as indicated in FIG. 5.

This part of the frontal wall of the stacking channel is formed, above the line 14, by the wing 10 of the bar element 6, as already stated.

In the manner described above, and as indicated in FIG. 3, by adjusting the height level or the vertical position of the brackets 25 and 30 for each stacking channel, the distances between the respective lower ends 29, 34 and the bottom 12 are set, thus delimiting the outlet for each stacking channel containing a single stack of packages 11.

The bracket 30 has a photoelectric cell 35 fixed to its outer surface. The photoelectric cell cooperates with a refractive element 36 in order to detect the article package while it is being delivered.

Since the photoelectric cell is fixed to the bracket 30, it is also moved, that is lowered or raised, along with the same bracket 30, when the outlet of the stacking channel is set.

Consequently, the vertical position of the photoelectric cell is automatically adjusted in accordance with the height of the packages 11 stacked within the related channel.

Under the stacking channels, at both sides of the distributor, there are two support elements 37 and 38 that hold a grate 39, as it appears in FIGS. 2 and 3. The grate 39 has slits 40 which form guides perpendicular to the columns 2 and aimed at engaging the base of delivering members 41 so as to positively guide them in their stroke perpendicular to the columns 2.

A squared section cross bar 42 is fixed to a surface of the support element 38 that faces outwardly with respect to the distributor. A shock absorbing block 43 and a striking member 49 are fixed to a surface of the squared cross-section bar 42 located inwardly with respect to the distributor.

The striking member 49 is made of ferromagnetic material. Each delivering member 41 includes a support body 44 with a sliding surface 51 that slides on the surface 53 of the grate 39, and a prominence 52 that inserts slidingly in a slit 40 of the same grate 39.

A permanent magnet 50 is fastened to a part of said support body 44 extending outwards, with respect of the distributor, see FIG. 2, while another shock absorbing block 45 and an electromagnet 46 are fixed to a middle point of the support body facing inwards with respect of the distributor.

The electromagnet 46 is able to create a magnetic traction force bigger than the one created by the permanent magnet 50. At the top of the support body 44, there is a pusher 47 fixed thereto, that has a dimension such as to pass between two vertical elements 20,19, as it is shown in FIG. 3. The height of the pusher is lower than the height of a single package 11.

Referring to FIGS. 1,2 and 3, two pairs of stems 55,55a are respectively fixed to the longitudinal ends of the distributor, perpendicular to the coloumns 2,2a. In FIG. 2 only one stem appears. The stems form a pair of guides located at both sides of the distributor, and related pairs of cursors 48,48a slide along these guides.

Each pair of cursors 48,48a supports above them a cross bar 56, 56a that in this specific case has a squared cross section and is made of ferromagnetic material. The cross bar 56 has rollers 71 which run along tracks 72 fixed to the grate 39, so that bending or flexion of the cross bar is avoided. All this is shown in FIGS. 3 and 4.

Each cursor 48 is hinged at 57 to a stem 58 that has an end 61 hinged to a rocker 59 in its turn pivoting onto a stationary axle 60, as it appears in FIGS. 1 and 2. The other end of the rocker 59 is in engagement with a track 63 made on a disk 64 keyed onto, and rotated by a shaft 70.

As can be seen in FIG. 1, the disk 64 has two cam tracks 63 and 63a which are respectively made on opposite facings of the disk, so that the cam track 63 provokes the oscillation for the rocker 59, while the cam track 63a engages the end 62a of a second rocker 59a thus making it oscillate for driving the operating means located at the right side of the distributor, with reference to the same FIG. 1.

The distributor made in accordance with this embodiment is equipped with two operating groups, which are located at both longitudinal opposite ends of the same distributor, and the two respective disks 64 are turned by the common shaft 70 that crosses longitudinally the distributor.

With reference to FIGS. 1 and 2, a hopper 67,67a for each row of stacking channel is positioned near to the outlet for the packages 11 and at a level slightly lower than the lower delivery plane defined by the element 12. The hopper 67,67a has the task of conveying the packages that have been delivered towards a conveyor 69 that brings them from inside the distributor to a collecting area located outside the distributor.

During operation of the distributor, the shaft 70 is made to rotate uninterruptedly so that the pair of disks 64 through the tracks 63, 63a cause the ends 62, 62a of the rockers 59, 59a to oscillate.

The vertical oscillations of the ends 62, 62a provoke to-and-fro movements for the respective cursors 48 and 48a and thus for the cross bars 56, 56a annexed therto.

If the distributor is in operation and no packages 11,11a are requested to be delivered, the delivering means 41, 41a will be kept in their holding position stopped by the permanent magnet 50, 50a, fastened to the delivering element 41, 41a which are in abutment on the ferromagnetic bar 49, 49a that is supported by the structure of the distributor.

The pair of cross bars 56, 56a are made to oscillate with a to-and-fro movement, by the above mentioned drive link, and their movement directions are opposite to each other, so as to counterbalance the effect of the respective EP inertial masses.

As an alternative, the bars may be moved in the same direction, and this can be obtained by a skilled person through a suitable configuration of the drive links connected to the same bars.

The to-and-fro stroke of each cross bar 56, 56a has a related idle point located outwardly, with respect to the distributor, corresponding to a position wherein the cross bar 56, 56a is in abutment on the longitudinal row of electromagnets 46, 46a, which are not energized, slightly pressing thereonto.

The pressing action is damped by the shock absorbing blocks 45, 45a, and by the shock absorbing blocks 43, 43a so that all the acting forces are counterbalanced.

When the delivery of a package stacked in a certain stacking channel is requested, that is effected by means of electric-electronic devices which are not shown as they are not part of the invention, then the electromagnet 46, 46a, corresponding to the channel in which the packages 11, 11a to be withdrawn are stacked is energized.

In its to-and-fro motion, when it is located at the outward idle position, the cross bar 56, 56a strikes all the electromagnets 46, 46a, and only the electromagnet 46, 46a, previously energized is bound thereto by the magnetic atraction.

Since, as already said, the electromagnet 46, 46a, if energized, generates a magnetic force bigger than the one generated by the permanent magnet 50, 50a, then during the cross bar 46, 46a inward run, with respect of the distributor, the delivering element 41, 41a corresponding to the energized electromagnet 46, 46a, is also bound to said cross bar 56, 56a and therefore brought inward from its inoperative position, with respect to the distributor.

In its inward stroke, the delivering element 41, 41a, selected in the above mentioned way, has its own pusher 47, 47a, that while passing between two vertical elements 19-20, 10a-20a, strikes the package 11, 11a, placed at the bottom of the package stack and pushes said package towards the center of the distributor.

Said package 11, 11a, is made to translate towards the center of the distributor, while the packages stacked over it cannot translate in the same direction as they are stopped by the striking elements 28-33, 28a-33a.

In fact, the vertical ends 29-34, 29a-34a, of the striking elements 28-33, 28a-33a, projecting downwards, are located at a level slightly higher than the height of the package 11, 11a situated at the bottom of the stack.

Thus, the package 11, 11a, situated at the bottom of the stack, is withdrawn from the correspondent stack and conveyed by the hopper 67 or 67a to the conveyor 69 in order to be transferred to a zone where it is placed into a cassette.

The to-and-fro motion of each cross bar 56, 56a has its own idle point at the innermost position, with respect to the conveyor, which corresponds to the complete delivery of the packages out beyond the discharge outlet, delivery that is carried out by the pusher 47, 47a.

The correctness of the delivery of the package is checked by the photocells 35 that can also calculate the packages delivered by each single stack in order to signal that the stack has run out of packages or to calculate the delivered packages in case a multiple delivery has been requested.

As soon as the translating package has been delivered, the stack of packages from which the just delivered package has been withdrawn, lowers and goes in abutment on top of the pusher 47, 47a.

During the back run of the pusher 47, 47a the subsequent package 11, 11a, now placed at the bottom of the stack and resting on said pusher 47, 47a, due to friction, is brought with the same to translate in the same direction as said pusher 47, 47a, but such a translation is restrained by the pair of vertical elements 20-23, 20a–23a that delimit the back wall of the stacking channel.

In this way, when the cross bar 56, 56a is near to the outer idle point of its stroke, the delivering member 41, 41a is brought back to its end outward position, with respect to the distributor, in which position the permanent magnet 50, 50a, touches the ferromagnetic bar 49, 49a.

Since the electromagnet 46, 46a has been previously deactivated, the permanent magnet 50, 50a holds the delivering member 41, 41a, while the bar 56, 56a starts again its stroke directed inward, toward the distributor.

If the consecutive expulsion of "n" packages from the same stack has been requested, the electromagnet 46, 46a will be energized through "n" operative cycles by a control unit, not illustrated.

If the packages are relatively wide, it is favourable to use at least two identical delivering members 41, 41a placed side by side and operated simultaneously in the above indicated manner.

Figure 6:
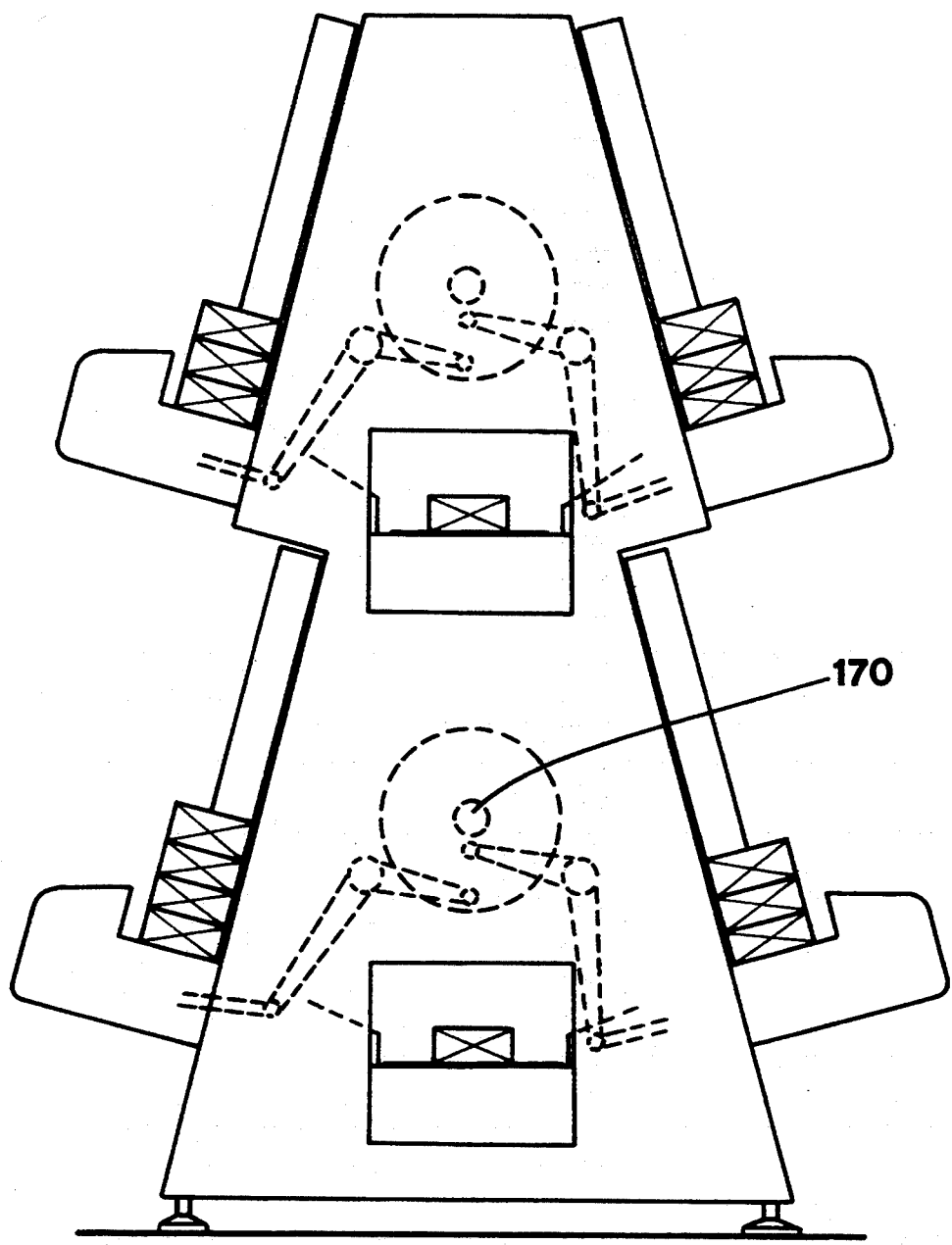
FIG. 6 is front view of a particular configuration of two superimposed distributors.

Finally, FIG. 6 illustrates a configuration where two distributors are superimposed, so that they require the same space as a single distributor.

Advantageously, the axis 170 of the lower distributor is coaxial with the axis 70 of the flanked distributor.

The description of the distributor with reference to the enclosed figures of drawings is purely an example and is not limitative. Therefore it is evident that various modifications, suggested by the experience or by operation or use, can be made in the distributor all falling within the scope of the following claims.

I claim:

1. An automatic distributor of packages comprising:
    two parallel rows of package stacking means inclined and convergent upwards, said stacking means having vertical channels for stacking the packages, and having counterfacing outlets;
    delivering means for each channel for delivering one package from each channel, with each delivering means including a delivery element sliding transversely to a longitudinal axis of the distributor;
    means for transporting delivered packages to a collecting zone, said transporting means being situated between said two rows of stacking means;
    said delivering means having guide elements having slide guides perpendicular to a longitudinal axis of said transporting means;
    delivering elements slidingly guided by said slide guides and moved to cross transversely at least one of said channel to push a lowermost package of the respective stack of packages out of said channel;
    holding elements to hold said delivering elements when inoperative; and
    operating means, for operating said delivering means.

2. The distributor according to claim 1, wherein said channels of each row of said stacking means include flanked bars having coplanar wings turned toward the opposite row of stacking means, so that a channel is delimited by two parallel side walls of two adjacent section bars and by two coplanar wings of said adjacent section bars with an open side turned outwards for loading said packages.

3. The distributor according to claim 1, wherein said stacking channels have striking means with adjustable height for adjusting the height of the outlet for the packages in each single channel.

4. The distributor according to claim 3, wherein said striking elements have sensor means for detecting the passage of each package through the outlet of each stacking channel.

5. The distributor according to claim 1, wherein each delivering means is placed below each row of stacking means and includes:
    a support body, sliding on the slide guide, and having a prominence sliding in a respective slit made in said slide guide; a permanent magnet fastened to said support body for magnetic attachment to a ferromagnetic member fixed to said distributor;
    an electromagnet fixed to a middle point of said support body and turned toward said transporting means, said electromagnet being capable of creating a magnetic force larger than a magnetic force created by said permanent magnet;
    at least one pushing element fixed at a top of said support body and brought to pass through a respective channel while pushing a lowermost package of a stack contained therein.

6. The distributor according to claim 5, further comprising:
    shock absorbing blocks placed between said permanent magnet and said member fixed to said distributor, and between said electromagnet and the respective support body.

7. The distributor according to claim 1, wherein a pair of chutes are placed under said outlets of respective rows of stacking means, the chutes leading to a central conveyor extending longitudinally to said distributor.

8. The distributor according to claim 1, wherein the operating means comprise a pair of bars extending longitudinally in respect to the distributor, the bars oscillating in directions perpendicular to the distributor.

* * * * *